(12) United States Patent
Camp et al.

(10) Patent No.: US 9,430,375 B2
(45) Date of Patent: Aug. 30, 2016

(54) TECHNIQUES FOR STORING DATA IN BANDWIDTH OPTIMIZED OR CODING RATE OPTIMIZED CODE WORDS BASED ON DATA ACCESS FREQUENCY

(71) Applicant: INTERNATIONAL BUSINESS MACHINES CORPORATION, Armonk, NY (US)

(72) Inventors: Charles John Camp, Sugarland, TX (US); Timothy John Fisher, Cypress, TX (US); Bryan Bordeaux Grandy, Houston, TX (US); Thomas Parnell, Zurich (GB); Andrew Dale Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 14/144,158

(22) Filed: Dec. 30, 2013

(65) Prior Publication Data

US 2015/0186260 A1    Jul. 2, 2015

(51) Int. Cl.
*G06F 11/00* (2006.01)
*G06F 12/02* (2006.01)
*G06F 11/10* (2006.01)

(52) U.S. Cl.
CPC ....... *G06F 12/0246* (2013.01); *G06F 11/1012* (2013.01)

(58) Field of Classification Search
CPC ................ G06F 12/0246; G06F 2212/7208; G06F 2212/7201
See application file for complete search history.

(56) References Cited

U.S. PATENT DOCUMENTS

| | | | |
|---|---|---|---|
| 6,324,620 B1 * | 11/2001 | Christenson | G06F 3/061 710/74 |
| 7,072,307 B2 | 7/2006 | Tong et al. | |
| 7,346,833 B2 | 3/2008 | Hagh et al. | |
| 7,424,577 B2 * | 9/2008 | Bali | G06F 12/0804 711/118 |
| 8,171,059 B2 * | 5/2012 | Nagashima | G06F 3/0625 707/802 |
| 8,539,142 B2 * | 9/2013 | Ogawa | G06F 3/061 711/103 |
| 8,569,765 B2 * | 10/2013 | Hsieh | H01L 27/0629 257/334 |
| 9,158,725 B2 * | 10/2015 | Moyer | G06F 13/4059 |
| 2010/0235709 A1 | 9/2010 | Kowalski et al. | |
| 2012/0155167 A1 * | 6/2012 | Uehara | G11C 11/5628 365/185.03 |
| 2012/0166914 A1 | 6/2012 | Khandekar et al. | |
| 2013/0246878 A1 | 9/2013 | Pancholi et al. | |
| 2013/0275716 A1 * | 10/2013 | Nishida | G06F 8/4441 711/207 |
| 2014/0122774 A1 * | 5/2014 | Xian | H01L 27/0629 711/103 |

FOREIGN PATENT DOCUMENTS

JP    2007104708 A    4/2007

OTHER PUBLICATIONS

Japanese Patent Office, PCT/JP2014005293; Int'l Search Report and Written Opinion of the International Searching Authority dated Dec. 16, 2014. (7 pg).

* cited by examiner

*Primary Examiner* — Esaw Abraham
(74) *Attorney, Agent, or Firm* — Brian F. Russell; Randall J. Bluestone (57) ABSTRACT

A technique for operating a data storage system that includes a non-volatile memory array controlled by a controller includes storing, in the non-volatile memory array, first data whose frequency of access is above a first access level in a bandwidth optimized code word. Second data whose frequency of access is below a second access level is stored in the non-volatile memory in a code rate optimized code word.

18 Claims, 6 Drawing Sheets

TECHNIQUES FOR STORING DATA IN BANDWIDTH OPTIMIZED OR CODING RATE OPTIMIZED CODE WORDS BASED ON DATA ACCESS FREQUENCY

BACKGROUND OF THE INVENTION

This disclosure relates to storing data in a non-volatile memory based on data access frequency, and more specifically, to storing data in a non-volatile memory in bandwidth optimized or coding rate optimized code words based on data access frequency.

Flash memory (or simply flash) is a non-volatile memory technology that stores one or more bits of data per memory cell as a charge on a floating gate of a transistor. As cell densities and the number of bits stored per cell in flash continue to increase in subsequent generations of flash technology, the data stored in the memory cells become more vulnerable to bit errors induced by read disturbs, high ambient temperatures, long storage durations, and other factors. Consequently, the number of read/write cycles for which flash memory devices are rated has generally been declining even while storage density and cost per unit of data have been improving.

In digital transmission and storage, data may be detected as including errors and data may be corrected or discarded. The likelihood that a particular bit is detected as being erroneous, prior to performing any error correction, is known as the raw bit error rate (RBER). Uncorrected bit error rate (UBER) is another quality metric in digital transmission and storage. UBER characterizes the likelihood that a given bit is erroneous following the performance of any error correction. Error-correcting codes (ECCs) modify stored or transmitted data (generally by adding redundant information to the original data) so that errors may be corrected after receipt or retrieval of the data. ECC memory may be used in, for example, data processing systems where data corruption cannot generally be tolerated (e.g., scientific or financial computing). For example, a flash memory controller may implement an ECC and may be employed in a solid-state drive (SSD), e.g., a flash drive, that is used in place of a hard disk drive (HDD).

Due to the design of flash, data of a flash memory device cannot be directly overwritten (as contrasted with data on an HDD which can be directly overwritten). When data is first written to a flash, memory cells of the flash all start in an erased state and data is usually written to the memory cells in pages (e.g., 16 kilobyte (kB) pages). In general, a flash controller of the flash drive manages the flash and interfaces with the host system using a logical-to-physical mapping system (commonly known as logical block addressing (LBA)) provided by a flash translation layer (FTL). When new data is received by the flash controller to replace older data already written to the memory cells, the flash controller writes the new data to a new physical location and updates the logical mapping to point to the new physical location. In this case, the data in the old physical location is no longer valid and needs to be erased before data can be written to the old physical location again. As is known, flash can only be programmed and erased a limited number of times (often referred to as the maximum number of program/erase (P/E) cycles) over the life of the flash. In general, single-level cell (SLC) flash is designed for higher performance and longer endurance and can typically operate between 50,000 and 100,000 cycles. In contrast to SLC flash, multi-level cell (MLC) flash is designed for lower cost applications and has a reduced P/E cycle count (i.e., the P/E cycle count for MLC flash is typically between 3,000 and 5,000 P/E cycles).

As is known, write amplification (WA) is an undesirable phenomenon associated with non-volatile memory (e.g., flash) where the actual amount of physical information written is a multiple of the logical amount intended to be written. Because flash is designed to be erased before the flash can be rewritten, the process to perform write operations results in moving (or rewriting) user data and metadata more than once. The multiplying effect increases the number of writes required over the life of the flash which shortens the time the flash can reliably operate. The increased writes also consume bandwidth to the flash which may reduce random write performance to the flash. In general, lower WA for a flash is desirable as a lower WA corresponds to a reduced number of P/E cycles to write data to the flash and, as such, increased flash drive life.

BRIEF SUMMARY

The present disclosure is generally directed to a technique for operating a data storage system that includes a non-volatile memory array controlled by a controller. The technique includes storing, in the non-volatile memory array, first data whose frequency of access is above a first access level in a bandwidth optimized code word. Second data, whose frequency of access is below a second access level, is stored in the non-volatile memory in a code rate optimized code word. In one or more embodiments, the first and second access levels may be the same.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turbo product codes (TPCs) are a class of error correcting codes (ECCs) that have been used in a variety of applications, e.g., cell phones, satellite communications, wireless communications, and tape media. In general, TPCs have a relatively high coding rate, work well in noisy environments, and can be readily implemented in application specific integrated circuits (ASICs) and field-programmable gate arrays (FPGAs). TPCs are iterative in nature and can reliably correct relatively high raw bit error rates (RBERs) with relatively high coding rates generally making TPCs ideal for noisy environments. For example, TPCs may be advantageously employed in conjunction with various types of non-volatile storage devices, e.g., NAND flash memory (or simply NAND flash).

In general, TPCs may be employed in non-volatile storage devices (e.g., solid-state drives (SSDs) that include flash) to correct RBERs as high as two percent and, in this manner, may be employed as an important tool in extending a mean lifetime of a non-volatile storage device to a point where non-volatile storage devices are economical and reliable in enterprise applications. TPC is particularly good at reducing RBER when a TPC word is relatively long. For example, a TPC with a matrix of 400 columns and 352 rows allows for correcting three bits in each row and each column, as well as a parity bit to minimize miscorrections. For a 17,600 byte code word with a 15,066 byte data payload, the coding rate (which is the data payload divided by the total amount of bytes (i.e., data payload plus overhead check information)) is about 85.6 percent. In this case, about 14.4 percent of the information stored (in the 17,600 byte code word) is overhead checking and correction information and 85.6% of the 17,600 byte code word is the data payload (e.g., customer data). A TPC with a matrix of 400 columns and 352 rows is able to reliably correct RBERs of up to about 1.09 percent. A TPC with a matrix of 400 columns and 352 rows (e.g., 372 columns and 324 rows of data payload) is referred to as having a check strength of 3×3 as three bits in a row and three bits in a column can be corrected. It should be appreciated that the disclosed techniques are applicable to different matrix sizes and correspondingly different check strengths. Moreover, it is contemplated that the disclosed techniques are applicable to code words generated with ECCs other than a TPC.

While a TPC with a matrix of 400 columns and 352 rows is relatively powerful, deploying such a TPC in a non-volatile storage device, e.g., a solid-state drive (SSD) that includes flash (e.g., NAND flash), results in a relatively large code word. For example, for a host requested data size of 4 kilobytes (kB) or 4096 bytes in a data storage system deploying flash, a relatively large read amplification occurs at a storage bus associated with the flash. In this example, reading 4096 bytes requires either one or two complete 17600 byte code words to be read and decoded before the requested 4096 bytes may be returned. The latter case, reading two complete code words, arises when the requested data straddles two code words. On average, reading 4096 bytes from code words having a length of 17600 bytes results in an average read amplification of more than 5. That is, for a 17,600 byte code word that has a computed read amplification of five and a desired read throughput of 200K 4 kB input/output (I/O) operations per second (IOPs), a flash controller is required to read more than 4 GB/second of data to return roughly 800 MB/second of data to a host. Requiring a flash controller to read more than 4 GB/second of data to return 800 MB/second of data to a host results in wasted bandwidth and relatively high power dissipation.

One solution to minimize wasted bandwidth is to utilize shorter TPC words. However, TPC words that hold one 4 kB page (as contrasted with approximately four 4 kB pages) with a check strength of 3×3 have a relatively low coding rate (e.g., between seventy and eighty percent). While such codes are relatively powerful and can handle relatively high RBERs, employing such an ECC scheme for a flash controller requires a relatively large number of NAND bits to be dedicated to corrections and a resulting flash drive would probably not be competitive from the standpoint of cost. To deal with this issue, designs employing variable strength ECCs have been proposed. In designs employing variable strength ECCs, in response to an RBER increasing the design switches from a lower level ECC to a more powerful higher level ECC. Unfortunately, changing from a lower level ECC to a higher level ECC in a NAND flash means that as an associated device ages, the ECC consumes more NAND flash bits. An ECC that consumes additional NAND flash bits as an associated device ages may be acceptable, depending on the distribution of bit errors in the flash.

According to one aspect of the present disclosure, techniques are disclosed for segregating an incoming workload and assigning more frequently accessed data (or hot data) to a smaller container size so that wasted bandwidth is minimized (albeit at reduced coding rate). Less frequently accessed data (or cold data) or data that is typically accessed in sequentially accessed patterns is stored in a large container so that an associated coding rate results in more efficient use of flash (albeit at higher bandwidth requirements). Assuming data is only relatively lightly accessed, employing a larger container to increase a coding rate is desirable. According to aspects of the present disclosure, different ECC mechanisms may be implemented using a same internal array (so that only one TPC engine is required) to improve efficiency.

For example, a TPC engine and matrix may be created that can hold up to 17,600 bytes (with a maximum data payload of 15,066 bytes and 2,534 bytes of checking and correction information). A container may then be defined that includes from 1 byte to 15,066 bytes (padding zeroes as required to encode/decode the code word) of data payload and 2,534 bytes of checking information. In one embodiment, correction is performed on three different container sizes, with no additional work required (as all containers pad unused data bytes with zeroes prior to encoding/decoding). For example, a one-quarter page container may be defined that includes 4,400 bytes, a one-half page container may be defined that includes 8,800 bytes, and a one page container may be defined that includes 17,600 bytes.

A one-quarter page container may include a data payload of up to 1,866 bytes and 2,534 bytes of overhead checking information (with at least 13,200 bytes of padded zeroes that are not written to or read from flash, but are added during the encoding/decoding processes). A one-half page container may include a data payload of up to 6,266 bytes and 2,534 bytes of overhead checking information (with at least 8,800 bytes of padded zeroes that are not written to or read from flash, but are added during the encoding/decoding processes). A one page container may include a data payload of up to 15,066 bytes and 2,534 bytes of overhead checking information (with padded zeroes employed in unused bytes of the data payload). In general, an output of an encoder only provides bytes associated with a data payload and bytes of overhead checking information (i.e., padded zeroes are eliminated). In this manner, information written to a flash array by a flash controller is reduced (assuming there are padded zeroes, as the padded zeroes are not written to the flash array).

In at least one embodiment, at the time a flash block is written to a flash array, a flash controller is configured to pack as many differently sized containers as can fit into a storage block (e.g., a page). It should be appreciated that a container size, a number of data payload bytes, and an address for each of the containers is also stored (e.g., in the storage block or in another location). Alternatively, and for simplicity, a flash block write can be declared to hold only one of multiple data payload types for a store operation. When a flash block write is declared to hold only one of multiple data payload types for a store operation, a container size may correspond to a flash block parameter.

In one or more embodiments, when a host read is performed, a flash controller determines where a desired data payload is physically stored in the flash and a container type (by accessing a data structure) for the desired data payload. One or more containers are then read and processed through a decoder (e.g., a TPC decoder) with zeroes padded, as necessary, to provide a data payload. After decoding, requested data is then returned to the host. Additional containers (i.e., containers that do not include requested data, but were read in order to return the requested data) that are read may be discarded or held in a buffer for a certain amount of time in the event that a data payload in the additional containers is requested.

In determining which container to allocate for a particular host write access, a flash controller may utilize collected statistics (based on an address or range of addresses) that indicate how data associated with the write access is typically read. For example, when there is a high probability that an amount of data read corresponds to a certain size page container, then the data may be stored in the certain size container irrespective of an access frequency. As one example, if given data is typically read in an amount that corresponds to a data payload of a one-half page container, then the given data is stored in a one-half page container. In the event that no statistics are available on how requested data is read, a flash controller may employ frequency of access to determine whether the data is hot or cold when selecting a container for a data payload.

As one example, a flash controller may be configured to: pick the one-quarter page container for the hottest host accesses (e.g., data accessed less than every one-hundred milliseconds); the one-half page container for next coldest accesses (e.g., data accessed between every one-hundred and two-hundred milliseconds); and the one page container for the coldest accesses (e.g., data accessed less frequently than once per two-hundred milliseconds). In at least one embodiment, for one-half page transfers the flash controller does not use one-quarter page containers due to coding rate inefficiencies. In this case, either one-half page containers or one page containers are selected by the flash controller. While the discussion herein focuses on one-quarter page, one-half page, and one page containers, it should be appreciated that the disclosed techniques may be employed in data storage systems that use more or less than three size containers and different page size granularities (e.g., a storage system may employ one-sixteenth page, one-eighth page, one-quarter page, one-half page, and one page containers) for the containers, depending on how data is typically written to flash. Additionally, code words may be defined in such a way that the number of code words per flash page is not an integer power of 2, e.g. one-third page containers or one-sixth page containers.

Figure 1:
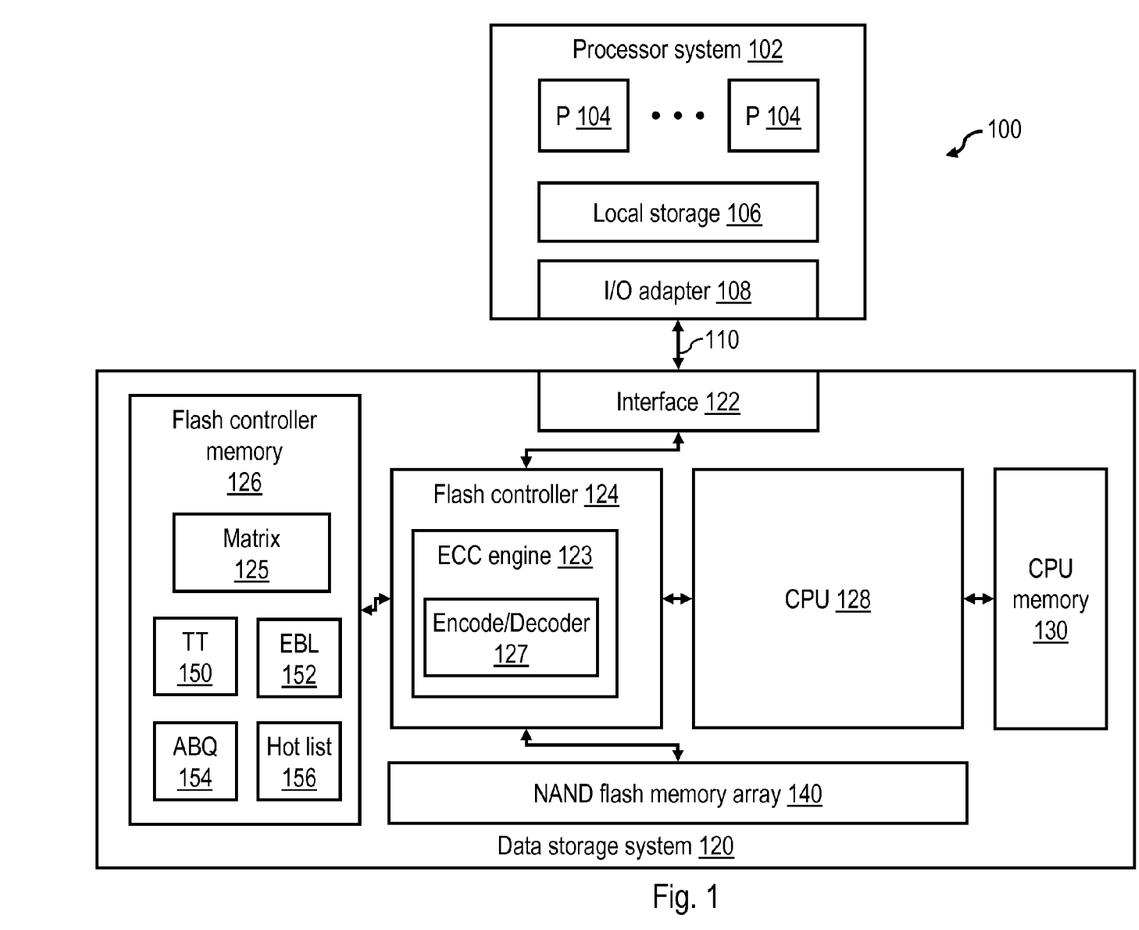
FIG. 1 is a high level block diagram of a data processing environment configured according to one embodiment of the present disclosure.

With reference now to the figures and with particular reference to FIG. 1, there is illustrated a high level block diagram of an exemplary data processing environment 100 including a data storage system that employs NAND flash memory (or simply NAND flash) as is described further herein. As shown, data processing environment 100 includes at least one processor system 102 having one or more processors 104 that process instructions and data. Processor system 102 may additionally include local storage 106 (e.g., dynamic random access memory (DRAM) and/or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER™ series available from International Business Machines Corporation), or a mainframe computer system. Processor system 102 can also be an embedded processor system using various processors such as ARM™, PowerPC™, Intel™ X86, or any other processor combined with memory caches, memory controllers, local storage, input/output (I/O) bus hubs, etc.

Processor system 102 further includes an I/O adapter 108 that is coupled directly (i.e., without any intervening device) or indirectly (i.e., through at least one intermediate device) to a data storage system 120 via an I/O channel 110. In various embodiments, I/O channel 110 may employ any one or a combination of known or future developed communication protocols, including, for example, fibre channel (FC), FC over Ethernet (FCoE), Internet small computer system interface (iSCSI), transport control protocol/Internet protocol (TCP/IP), peripheral component interconnect express (PCIe), etc. I/O operations communicated via I/O channel 110 include read I/O operations by which processor system 102 requests data from data storage system 120 and write I/O operations by which processor system 102 requests storage of data in data storage system 120.

In the illustrated embodiment, data storage system 120 includes an interface 122 through which data storage system 120 receives and responds to requests from processor system 102 via I/O channel 110. Interface 122 is coupled to a flash controller 124 (e.g., an application specific integrated circuit (ASIC) or field programmable gate array (FPGA)) having an associated flash controller memory 126 (e.g., dynamic random access memory (DRAM)). In one or more embodiments, flash controller 124 includes an ECC engine 123 (e.g., a TPC engine) that includes an encoder/decoder 127 that is used to encode/decode information stored in a NAND flash memory array 140. According to the present disclosure, flash controller 124 is configured to remove padded zeroes from an encoded code word prior to storing the code word in NAND flash memory array 140. Flash controller 124 is also configured to insert padded zeroes in a code word read from NAND flash memory array 140 prior to decoding the read code word. As is illustrated, a matrix 125 may be formed in flash controller memory 126 to facilitate forming a code word. For example, matrix 125 may be a TPC matrix having 400 columns and 352 rows. It should be appreciated that matrix 125 may, if desired, be provisioned in a different portion of data storage system 120. Flash controller 124 is additionally coupled to a CPU 128 that has an associated CPU memory 130 (e.g., DRAM) and is further coupled to NAND flash memory array 140.

In embodiments in which flash controller 124 is implemented with an FPGA, CPU 128 may program and configure flash controller 124 during start-up of data storage system 120. After startup, in general operation flash controller 124 receives read and write I/O operations via I/O channel 110 and interface 122 to read data stored in NAND flash memory array 140 and/or to store data in NAND flash memory array 140. Flash controller 124 services these I/O operations, for example, by accessing NAND flash memory array 140 to read or write the requested data from or into NAND flash memory array 140 or by accessing a memory cache (not illustrated) associated with NAND flash memory array 140. As noted above, flash controller 124 may also be configured with ECC engine 123, which includes encoder/decoder 127 for encoding data that is to be written to NAND flash memory array 140 and decoding data that is read from NAND flash memory array 140. As is mentioned above, in encoding/decoding data, flash controller 124 accesses matrix 125 that may, for example, be implemented within flash controller memory 126.

Flash controller 124 may also implement a flash translation layer (FTL) that provides logical-to-physical address translation to enable access to specific memory locations within NAND flash memory array 140. In general, a request received by flash controller 124 from a host device, such as processor system 102, contains a logical block address (LBA) at which the data is to be accessed (read or written) and, if a write operation, the write data to be stored to data storage system 120. The request may also specify the amount (or size) of the data to be accessed. Other information may also be communicated depending on the protocol and features supported by data storage system 120. The LBA provided by the host device thus corresponds to a page within a logical address space. The flash translation layer translates an LBA into a physical address assigned to a corresponding physical location in NAND flash memory array 140. Flash controller 124 may perform address translation and/or store mappings between logical and physical addresses in a logical-to-physical translation data structure, such as translation table (TT) 150, which may be stored in flash controller memory 126.

As further shown in FIG. 1, flash controller 124 may maintain one or more additional data structures to track information regarding NAND flash memory array 140, which data structures may also be buffered in flash controller memory 126. These data structures can include, for example, an erased block list (EBL) 152 that identifies blocks of physical memory in NAND flash memory array 140 that have been erased, an available block queue (ABQ) that identifies blocks of physical memory in NAND flash memory array 140 that are available for programming with write data of write I/O operations, and a hot list 156 that identifies frequently accessed LBAs and may be used to determine a container size to select for a data payload on a write I/O operation. As will be appreciated by those skilled in the art, in various embodiments flash controller 124 may combine one or more of these data structures in a common data structure and/or implement additional data structures to manage NAND flash memory array 140.

NAND flash memory array 140 may take different forms in various embodiments. Referring now to FIGS. 2-5, there is depicted one exemplary arrangement of physical memory within a NAND flash memory array 140 in accordance with the present disclosure.

Figure 2:
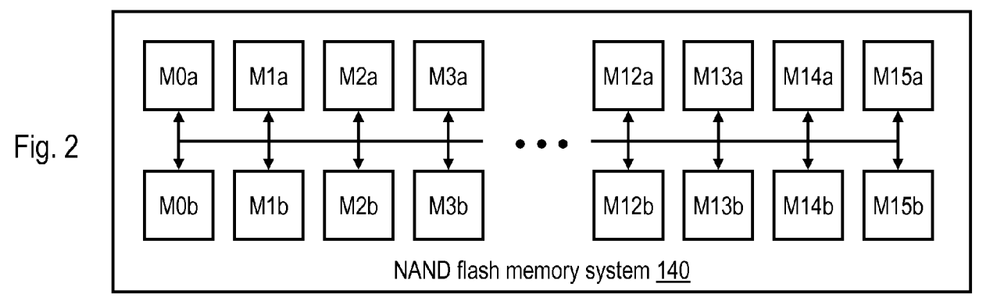
FIGS. 2-5 illustrate an exemplary arrangement of physical memory within a NAND flash memory array in accordance with one embodiment of the present disclosure.

As shown in FIG. 2, NAND flash memory array 140 may be formed from thirty-two (32) individually addressable NAND flash storage devices. In the illustrated example, each of the flash storage devices M0a-M15b may take the form of a board-mounted flash module, for example, a single level cell (SLC), multi-level cell (MLC), three level cell (TLC), or quad level cell (QLC) NAND flash module. The thirty-two NAND flash modules are arranged in sixteen groups of two (M0a, M0b) through (M15a, M15b). For purposes of a physical addressing scheme, each group of two modules may form a 'lane', which may also be referred to as a 'channel', such that NAND flash memory array 140 includes sixteen channels or lanes (Lane0-Lane15).

In one embodiment, each of the individual lanes has a respective associated bus coupling the lane to flash controller 124. Thus, by directing communications to one of the specific communication buses, flash controller 124 can direct communications to one of the lanes of flash modules. Because each communication bus for a given lane is independent of the communication buses for the other lanes, flash controller 124 can issue commands and send or receive data across the various communication buses at the same time, enabling flash controller 124 to access the flash modules corresponding to the individual lanes at, or very nearly at, the same time.

Figure 3:
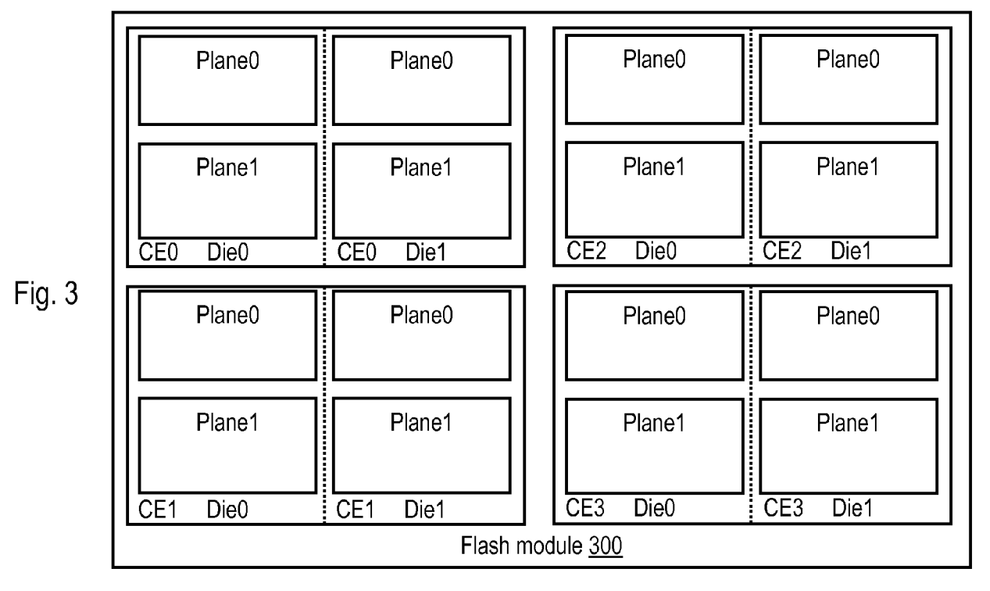

With reference now to FIG. 3, an exemplary flash module 300 is illustrated that can be utilized to implement any of flash modules M0a-M15b of FIG. 2. As shown in FIG. 3, the physical storage locations provided by flash module 300 are further subdivided into physical locations that can be addressed and/or identified through chip enables (CEs). In the example of FIG. 3, the physical memory of each flash module 300 is divided into four chip enables (CE0, CE1, CE2 and CE3), each having a respective CE line that is asserted by flash controller 124 to enable access to or from physical memory locations within the corresponding CE. Each CE is in turn subdivided into multiple dice (e.g., Die0 and Die1) each having two planes (e.g., Plane0 and Plane1). Each plane represents a collection of blocks (described below) that, because of the physical layout of the flash modules, are physically associated with one another and that utilize common circuitry (e.g., I/O buffers) for the performance of various operations, such as read and write operations.

Figure 4:
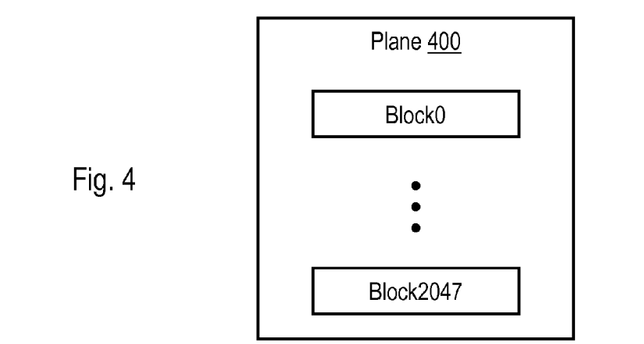
Figure 5:
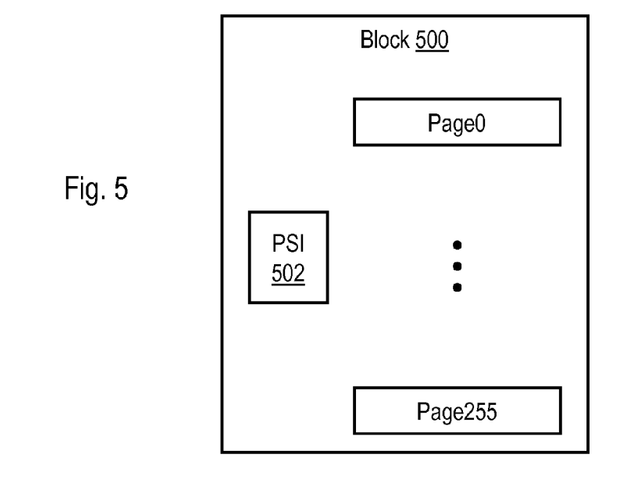

As is further shown in FIGS. 4 and 5, an exemplary plane 400, which can be utilized to implement any of the planes within flash module 300 of FIG. 3, includes, for example, 2048 blocks of physical memory. In general, a block 500 is a collection of physical pages that are associated with one another, typically in a physical manner. This association is such that a block is defined to be the smallest granularity of physical storage locations that can be erased within NAND flash memory array 140. In the embodiment of FIG. 5, each block 500 includes, for example, 256 physical pages, where a physical page is defined to be the smallest individually addressable data unit for write access. In the exemplary system, each physical page of data has a common capacity (e.g., 16 kB) for data storage plus additional storage for metadata described in more detail below. Thus, data is written into NAND flash memory array 140 on a page-by-page basis, but erased on a block-by-block basis.

Data may be retrieved (read) from NAND flash memory array 140 in a two-step process. In a first step, sometimes known as a fetch operation, an entire flash page is retrieved from the underlying flash storage medium and transferred to an output data buffer. In a second step, sometimes known as a data transfer operation, any subset of the previously fetched data may be transferred out of the flash memory device. Hence, the fetch component of each read operation has a minimum granularity of a single flash page, while the data transfer component of each read operation has a much smaller granularity, possibly as low as a single byte. As further shown in FIG. 5, each block 500 preferably includes page status information 502, which indicates the status of each physical page in that block 500 as retired (i.e., withdrawn from use) or non-retired (i.e., active or still in use). In various implementations, PSI 502 can be collected into a single data structure (e.g., a vector or table) within block 500, distributed within block 500 (e.g., as one or more bits of metadata appended to each physical page) or maintained elsewhere in data storage system 120 (e.g., in a data structure in flash controller memory 126).

As noted above, data storage system 120 does not generally allow external devices to directly address and/or access the physical memory locations within NAND flash memory array 140. Instead, data storage system 120 is generally configured to present a single contiguous logical address space to the external devices, thus allowing host devices to read and write data to and from LBAs within the logical address space while permitting flash controller 124 and CPU 128 to control where the data that is associated with the various LBAs actually resides in the physical memory locations comprising NAND flash memory array 140. In this manner, performance and longevity of NAND flash memory array 140 can be intelligently managed and optimized.

As writes occur to data storage system 120, flash controller 124 and CPU 128 invalidate the data stored in one of the physical pages of one of the erase blocks in the NAND flash memory array 140. New data is coalesced with data being written and eventually stored in different location in NAND flash memory array 140. It should be appreciated that pages or portions of pages are invalidated and, as such, portions of the NAND flash memory array 140 become unused. Flash controller 124 and CPU 128 eventually need to reclaim invalidated pages or portions of pages through a process called garbage collection. Particular erase blocks are chosen based on a number of factors including how much of the data within the erase blocks is invalid. Flash controller 124 logs physical block addresses (PBAs) of erased blocks in EBL 152. Valid data is read and written along with new writes from the host into blocks allocated from ABQ 154.

Because the flash translation layer implemented by data storage system 120 isolates the logical address space made available to host devices from the physical memory within NAND flash memory array 140, the size of NAND flash memory array 140 need not be equal to the size of the logical address space presented to host devices. In most embodiments it is beneficial to present a logical address space that is less than the total available physical memory (i.e., to over-provision NAND flash memory array 140). Over-provisioning in this manner ensures that physical memory resources are available when the logical address space is fully utilized, even given the presence of a certain amount of invalid data as described above. In addition to invalid data that has not yet been reclaimed the overprovisioned space can be used to ensure there is enough logical space even given the presence of memory failures and the memory overhead entailed by the use of data protection schemes, such as ECC, cyclic redundancy check (CRC), and parity.

Figure 6:
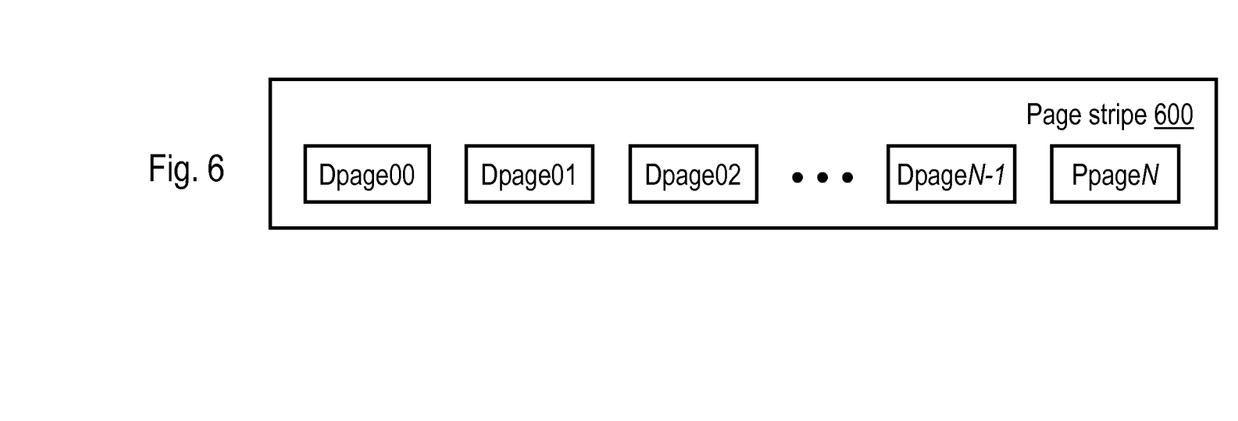
FIG. 6 depicts an exemplary implementation of page stripes in accordance with an embodiment of the present disclosure.

In one or more embodiments, data is written to groups of associated physical pages of NAND flash memory array 140 referred to herein as 'page stripes'. While the lengths of the various page stripes stored into NAND flash memory array 140 can and preferably do vary, in one embodiment each page stripe includes two to fifteen data pages of write data (typically provided by a host device) and one additional page (a 'data protection page') used to store data protection information for the write data. For example, FIG. 6 illustrates an exemplary page stripe 600 including N data pages (i.e., Dpage00 through DpageN−1) and one data protection page (i.e., PpageN).

Figure 7:
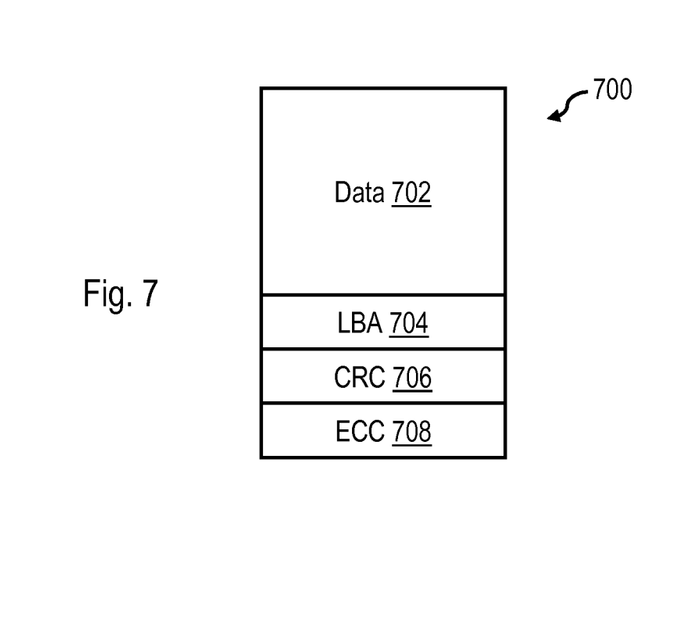
FIG. 7 illustrates an exemplary data page in accordance with one embodiment of the present disclosure.

FIG. 7 illustrates an exemplary format of each data page within the page stripe 700. In this example, data page 700 includes a 16 kB data field 702, as well as additional fields for metadata describing the data page. In the illustrated example, these metadata fields include an LBA field 704 containing the LBA of data page 700, a CRC field 706 containing the CRC value computed for the combination of data field 702 and LBA field 704, and an ECC field 708 containing an ECC value calculated, in the illustrated example, from a combination of contents of data field 702, LBA field 704, and CRC field 706.

Figure 8:
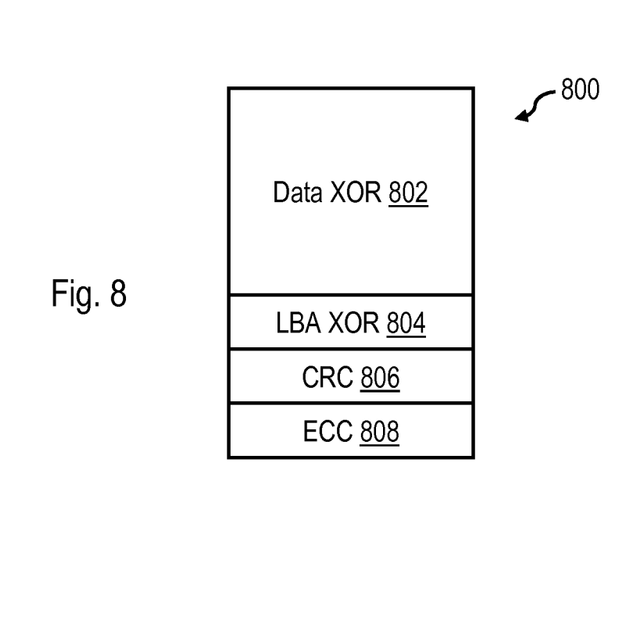
FIG. 8 depicts an exemplary data protection page in accordance with an embodiment of the present disclosure.

FIG. 8 depicts an exemplary format of the data protection page of page stripe 800. In the depicted example, data protection page 800 includes a data exclusive OR (XOR) field 802 that includes the bit-by-bit XOR of the contents of the data fields 702 of the data pages 700 in page stripe 600. Data protection page 800 further includes an LBA XOR field 804 that includes the bit-by-bit XOR of the LBA fields 704 of the data pages 700 in page stripe 600. Data protection page 800 finally includes a CRC field 806 and ECC field 808 for respectively storing a CRC value and an ECC value for data protection page 800. Such a protection scheme is commonly referred to as RAID 5, since the parity field will not always be located on one particular flash plane. However, it should be appreciated that alternate data protection schemes such as Reed-Solomon can be used.

The formats for data pages and data protection pages described above protect data stored in a page stripe using multiple different protection mechanisms. First, the use of the ECC bits in each data page allows for the correction of some number of bit errors within the flash page. Depending on the ECC method used it may be possible to correct hundreds of bits or even thousands of bits within a NAND flash page. After ECC checking and correction is performed, the corrected CRC field is used to validate the corrected data. Used together, these two mechanisms allow for the correction of relatively benign errors and the detection of more serious errors using only local intra-page information. Should an uncorrectable error occur in a data page, for example, due to failure of the physical page utilized to store the data page, the contents of the data field and LBA field of the failing data page may be reconstructed from the other data pages and the data protection page for the page stripe.

While the physical memory locations in which the data pages and data protection page of a page stripe will vary within NAND flash memory array 140, in one embodiment the data pages and data protection page that comprise a given page stripe are stored in physical memory locations selected to optimize the overall operation of the data storage system 120. For example, in some embodiments, the data pages and data protection page comprising a page stripe are stored such that different physical lanes are employed to store each of the data page and data protection page. Such embodiments support efficient access to a page stripe because flash controller 124 can access all of the pages of data that comprise the page stripe simultaneously or nearly simultaneously. It should be noted that the assignment of pages to lanes need not be sequential (i.e., data pages can be stored in any lane in any order), and unless a page stripe is a full length page stripe (e.g., containing fifteen data pages and one data protection page), the lanes utilized to store the page stripe need not be adjacent.

Having described the general physical structure and operation of data storage system 120, certain operational aspects of data storage system 120 are now described, including aspects relating to selecting container sizes for a data payload written to NAND flash memory array 140.

Figures 9, 10:
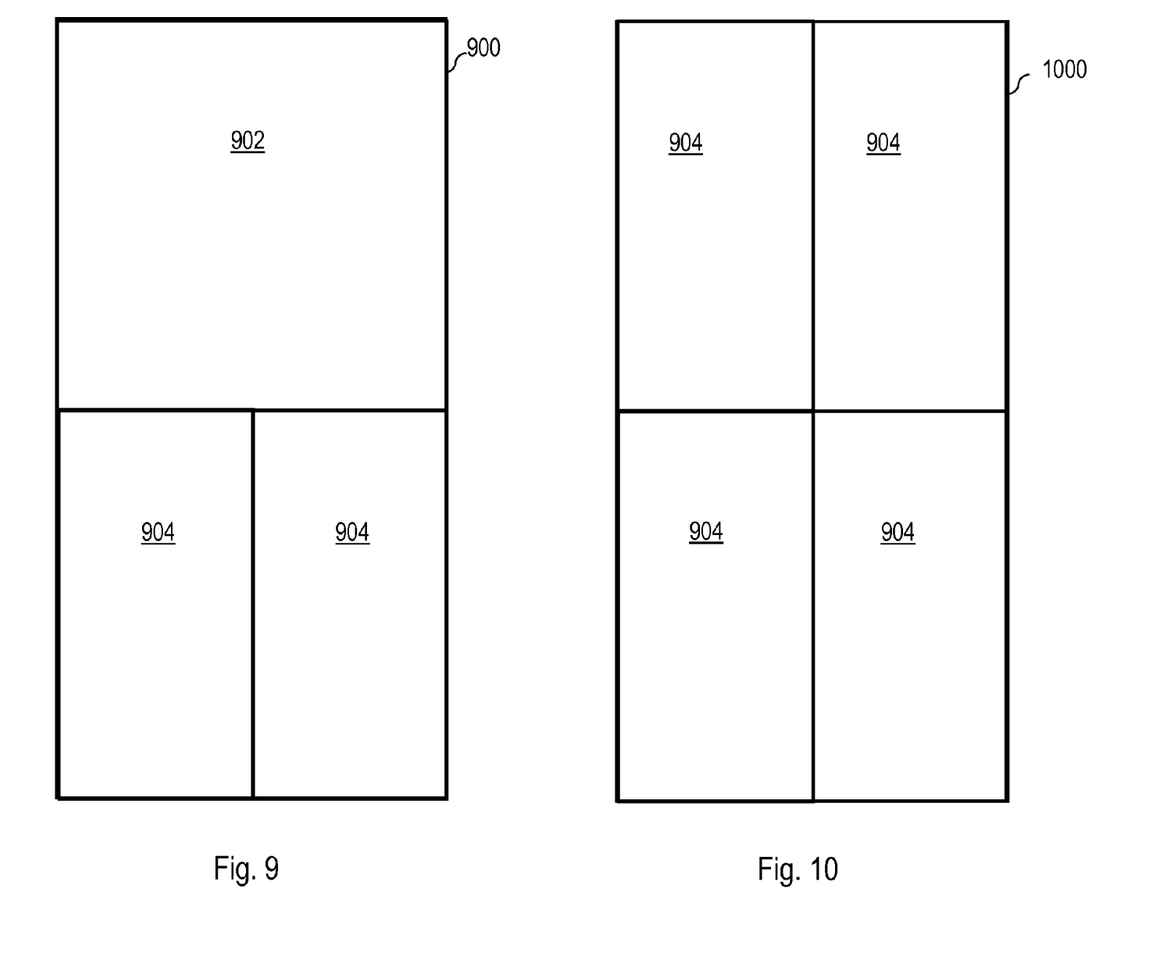
FIG. 9 depicts an exemplary page that is to be written to a non-volatile memory array, configured according to one embodiment of the present disclosure, that includes a one-half page container and two one-quarter page containers.
FIG. 10 depicts another exemplary page that is to be written to a non-volatile memory array, configured according to one embodiment of the present disclosure, that includes four one-quarter page containers.

In general, flash controller 124 is configured to segregate incoming workloads based on access history or the frequency of data access. With reference to FIG. 9, a page 900 is illustrated that is to be stored in NAND flash memory array 140. Page 900 includes one one-half page container 902 and two one-quarter page containers 904. For a 400 by 352 matrix, a one-quarter page container includes a data payload of up to 1,866 bytes and 2,534 bytes of overhead checking information (with at least 13,200 bytes of padded zeroes that are not written to or read from NAND flash memory array 140, but are added by flash controller 124 during the encoding/decoding processes). A one-half page container includes a data payload of up to 6,266 bytes and 2,534 bytes of overhead checking information (with at least 8,800 bytes of padded zeroes that are not written to or read from NAND flash memory array 140, but are added by flash controller 124 during the encoding/decoding processes).

According to the present disclosure, flash controller 124 segregates incoming workloads with more frequently accessed data (or hot data) being assigned to a smaller container size so that wasted bandwidth is minimized (albeit at reduced coding rate) and less frequently accessed data (or cold data) or data that is typically accessed in sequentially accessed patterns being assigned to a larger container so that an associated coding rate results in more efficient use of flash (albeit at higher bandwidth requirements). In FIG. 9, the data stored in container 902 is less frequently accessed than the data stored in container 904. With reference to FIG. 10, a page 1000 is depicted that includes four one-quarter page containers 904. In this case, flash controller 124 has assigned four incoming workloads to four respective one-quarter page containers 904 based on data access frequency or history of the data accesses associated with the incoming workloads.

Figure 11:
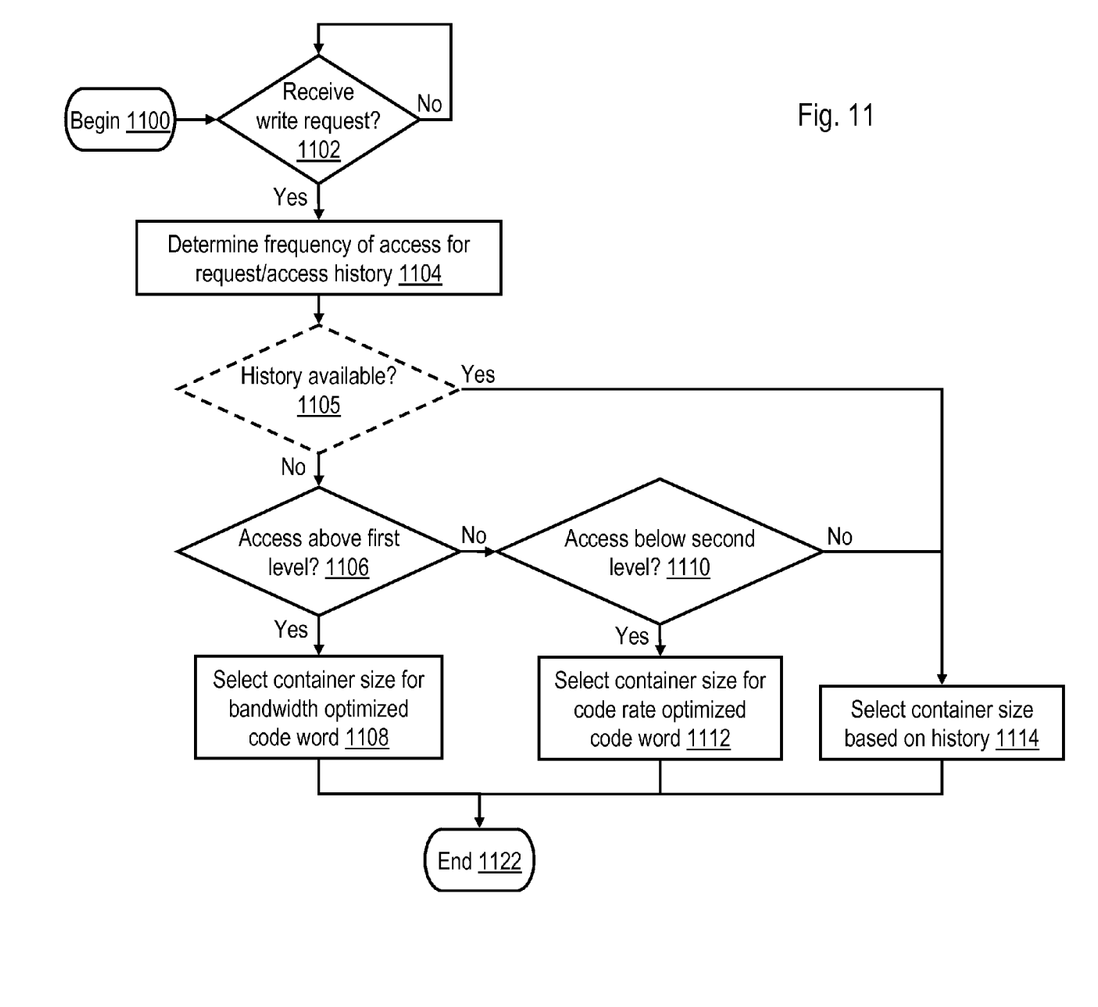
FIG. 11 depicts a flowchart of an exemplary process that is, for example, executed by a flash controller to select a container size for a data payload based on a frequency of access or an access history.

Referring now to FIG. 11, illustrated is a high level logical flowchart of an exemplary process for selecting a container size for incoming data that is to be written in data storage system 120. The container selection process may be performed, for example, by flash controller 124 and/or CPU 128 in hardware, firmware, software or a combination thereof. For simplicity of explanation, it will hereafter be assumed that the process is performed by flash controller 124.

The process begins at block 1100 and then proceeds to decision block 1102, where flash controller 124 awaits receipt of a write request from a host device, such as processor system 102. The write request includes, for example, data to be written into NAND flash memory array 140 and an indication of the target LBA(s) at which the host device would like for the data to be stored. In response to receipt of a write request, the process proceeds from block 1102 to block 1104, where flash controller 124 determines a frequency of data access (e.g., by reference to logical-to-physical address translation table 150) or an access history for the address specified in the write request. Next, in optional decision block 1105 flash controller 124 determines whether an access history is available for the write request. In response to an access history being available for the write request in block 1105, control transfers to block 1114 where flash controller 124 selects a container size based on the history.

For example, in response to the access history indicating that the stored data is always read in one-half page containers, flash controller 124 chooses a one-half page container for the write request. In the event that history is not available for the write request or the history is not utilized in selecting a container size, control transfers from block 1105 to decision block 1106. In block 1106 flash controller 124 determines whether the access frequency of the target LBA(s) of the write access is above a first access level (i.e., an access level that indicates the data is 'hot data'). In response to the access frequency being above the first access level in block 1106, control transfers to block 1108. In block 1108, flash controller 124 selects a container size (e.g., a one-quarter page container) for a bandwidth optimized code word. As mentioned above, selecting a smaller container (while decreasing a coding rate) improves bandwidth efficiency. From block 1108 control transfers to block 1122 until a next write request is received by data storage system 120.

In response to the access level not being above the first access level in block 1106, control transfers to decision block 1110. In block 1110, flash controller 124 determines whether the access frequency of the target LBA(s) of the write access is below a second level. In response to the access frequency being below the second access level in block 1110, control transfers to decision block 1112 where flash controller 124 selects a container size (e.g., a one page container) for a code rate optimized code word.

As mentioned above, selecting a larger container (while decreasing bandwidth efficiency) improves a code rate. From block 1112 control transfers to block 1122 until a next write request is received by data storage system 120. In response to the access level not being below the second access level in block 1110, control transfers to decision block 1114 where flash controller 124 selects a container size (e.g., a one-half page container) based on history, if available. In the event a history is not available, flash controller 124 may select a default container size. From block 1112 control transfers to block 1122. It should be appreciated that more than two access levels may be specified in the selection of a container size for a data payload.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transitory propagating media per se.

In addition, although embodiments have been described that include use of a NAND flash memory, it should be appreciated that the inventions herein are not limited to use with NAND flash memory, but are instead applicable to any other non-volatile random access memory (NVRAM) technology. For example, the disclosed techniques may be applied to phase-change memory (PCM), magnetoresistive RAM (MRAM) and resistive RAM (RRAM).

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items.

What is claimed is:

1. A method of operating a data storage system including a non-volatile memory array controlled by a controller, comprising:
   storing, in the non-volatile memory array, first data whose frequency of access is above a first access level in a bandwidth optimized code word container; and
   storing, in the non-volatile memory array, second data whose frequency of access is below a second access level in a code rate optimized code word container, wherein the second access level is the same as or less than the first access level and the bandwidth optimized code word container is smaller than the code rate optimized code word container.

2. The method of claim 1, further comprising:
   determining the frequency of access for the first data; and
   determining the frequency of access for the second data.

3. The method of claim 1, wherein the bandwidth optimized code word container and the code rate optimized code word container do not include padding when stored in the non-volatile memory array.

4. The method of claim 1, wherein the non-volatile memory array is a NAND flash memory array.

5. The method of claim 1, wherein the bandwidth optimized code word container is a one-quarter page container or a one-half page container and the code rate optimized code word container is a one page container.

6. The method of claim 1, further comprising:
   creating the bandwidth optimized code word container and the code rate optimized code word container using a turbo product code, wherein the first access level and the second access level correspond to a same value.

7. A data storage system, comprising:
   a controller coupled to a non-volatile memory array, wherein the controller is configured to:
   store, in the non-volatile memory array, first data whose frequency of access is above a first access level in a bandwidth optimized code word container; and
   store, in the non-volatile memory array, second data whose frequency of access is below a second access level in a code rate optimized code word container, wherein the second access level is the same as or less than the first access level and the bandwidth optimized code word container is smaller than the code rate optimized code word container.

8. The data storage system of claim 7, wherein the controller is further configured to:
   determine the frequency of access for the first data; and
   determine the frequency of access for the second data.

9. The data storage system of claim 7, wherein the bandwidth optimized code word container and the code rate optimized code word container do not include padding when stored in the non-volatile memory array.

10. The data storage system of claim 7, wherein the non-volatile memory array is a NAND flash memory array.

11. The data storage system of claim 7, wherein the bandwidth optimized code word container is a one-quarter page container or a one-half page container and the code rate optimized code word container is a one page container.

12. The data storage system of claim 7, wherein the controller is further configured to:
   create the bandwidth optimized code word container and the code rate optimized code word container using a turbo product code.

13. A program product for a data storage system including a non-volatile memory array, the program product comprising:
   a storage device; and
   program code stored within the storage device that, when executed by a controller of the data storage system, causes the data storage system to perform:
   storing, in the non-volatile memory array, first data whose frequency of access is above a first access level in a bandwidth optimized code word container; and
   storing, in the non-volatile memory array, second data whose frequency of access is below a second access level in a code rate optimized code word container, wherein the second access level is the same as or less than the first access level and the bandwidth optimized code word container is smaller than the code rate optimized code word container.

14. The program product of claim 13, wherein the program code, when executed by the controller, causes the data storage system to further perform:
   determining the frequency of access for the first data; and
   determining the frequency of access for the second data.

15. The program product of claim 13, wherein the bandwidth optimized code word container and the code rate optimized code word container do not include padding when stored in the non-volatile memory array.

16. The program product of claim 13, wherein the non-volatile memory array is a NAND flash memory array.

17. The program product of claim 13, wherein the bandwidth optimized code word container is a one-quarter page container or a one-half page container and the code rate optimized code word container is a one page container.

18. The program product of claim 13, wherein the bandwidth optimized code word container and the code rate optimized code word container are created using a turbo product code.

* * * * *